(12) United States Patent
Inoue et al.

(10) Patent No.: US 11,009,832 B2
(45) Date of Patent: May 18, 2021

(54) POINTER AND TIMEPIECE

(71) Applicant: CASIO COMPUTER CO., LTD., Tokyo (JP)

(72) Inventors: Kenichi Inoue, Hamura (JP); Masao Amano, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 330 days.

(21) Appl. No.: 16/120,570

(22) Filed: Sep. 4, 2018

(65) Prior Publication Data

US 2019/0072900 A1    Mar. 7, 2019

(30) Foreign Application Priority Data

Sep. 4, 2017   (JP) .............................. JP2017-169622

(51) Int. Cl.
*G04B 19/30* (2006.01)
*G04B 19/32* (2006.01)
*G01D 13/28* (2006.01)

(52) U.S. Cl.
CPC ........... *G04B 19/305* (2013.01); *G04B 19/32* (2013.01); *G01D 13/28* (2013.01)

(58) Field of Classification Search
CPC .... G04B 19/305; G04B 19/32; G04B 19/042; G01D 13/28; G01D 13/22
USPC ........................................................ 368/226
See application file for complete search history.

(56) References Cited

U.S. PATENT DOCUMENTS

| | | | | |
|---|---|---|---|---|
| 1,416,176 A | * | 5/1922 | Cuntz | G04B 19/32 368/226 |
| 5,751,662 A | * | 5/1998 | Shaw | G04B 19/305 368/227 |
| 7,016,264 B2 | * | 3/2006 | Ueno | G04C 17/00 313/510 |
| 2003/0112712 A1 | * | 6/2003 | Ferri | G04B 19/042 368/238 |
| 2004/0089219 A1 | * | 5/2004 | Burau | G01D 13/28 116/288 |
| 2009/0086582 A1 | * | 4/2009 | Olmes | G04B 19/32 368/67 |

FOREIGN PATENT DOCUMENTS

| | | |
|---|---|---|
| CN | 203299524 U * | 11/2013 |
| JP | S55-122194 U | 8/1980 |
| JP | S58-162074 U | 10/1983 |
| JP | S63-019817 Y2 | 6/1988 |
| JP | 2002-168971 A | 6/2002 |
| JP | 2007-263718 A | 10/2007 |

OTHER PUBLICATIONS

Notification of Reasons for Refusal dated Apr. 1, 2019 received in Japanese Patent Application No. JP 2017-169622 together with an English language translation.

* cited by examiner

*Primary Examiner* — Edwin A. Leon
(74) *Attorney, Agent, or Firm* — Scully Scott Murphy & Presser

(57) ABSTRACT

A pointer including a thick section formed on a pointer body in a manner to be thicker than a thickness of the pointer body, an accommodation section provided in the thick section in a manner to penetrate through a front and back of the thick section, and a luminous member provided in the accommodation section.

14 Claims, 3 Drawing Sheets

POINTER AND TIMEPIECE

CROSS-REFERENCE TO RELATED APPLICATION

This application is based upon and claims the benefit of priority from the prior Japanese Patent Application No. 2017-169622, filed Sep. 4, 2017, the entire contents of which are incorporated herein by reference.

BACKGROUND

1. Field of the Invention

The present invention relates to a pointer which is used in wristwatches and measuring instruments such as meters and a timepiece including the same.

2. Description of the Related Art

For example, as described in Japanese Patent Application Laid-Open (Kokai) Publication No. 2002-168971, a pointer of a wristwatch is known which has a structure where an opening section is provided in a pointer body, a luminous member is provided in the opening section, and a metal thin film having light permeability is provided on upper surfaces of the pointer body and the luminous member, whereby light emitted by the luminous member in a dark place is released upward through the metal thin film.

However, with such a pointer of a wristwatch, sufficient volume of the luminous member cannot be obtained because the thickness of the luminous member is the same thickness as the thickness of the pointer body. For this reason, such a luminous member cannot provide sufficient light-emitting luminance. Moreover, such a luminous member has a short light-emitting time and thus sufficient light-emitting time cannot be obtained.

SUMMARY

In accordance with one embodiment, there is provided a pointer comprising: a thick section formed on a pointer body in a manner to be thicker than a thickness of the pointer body; an accommodation section provided in the thick section in a manner to penetrate through a front and back of the thick section; and a luminous member provided in the accommodation section.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment applied to a wristwatch will hereinafter be described with reference to FIG. 1 to FIG. 3.

Figure 1:
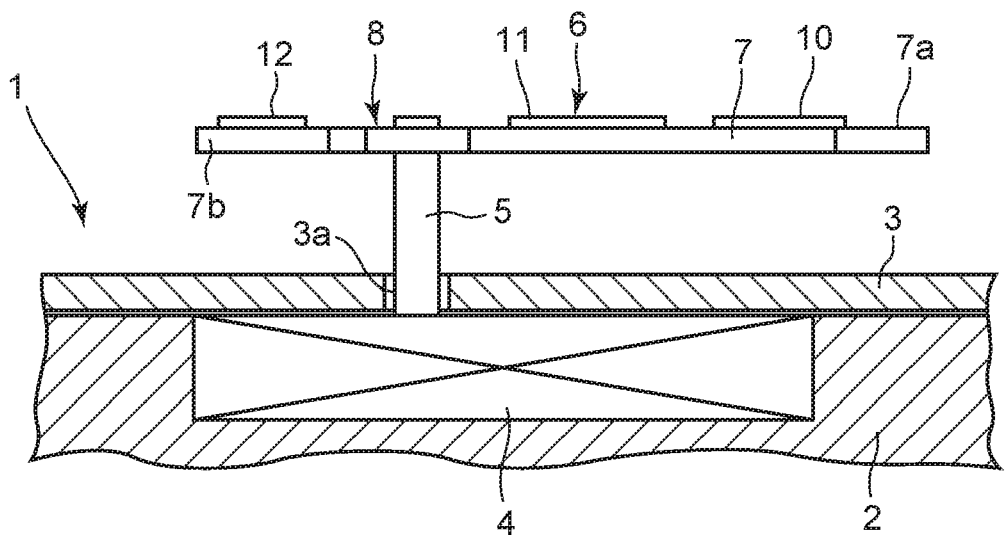
FIG. 1 is an enlarged sectional view showing the main components of a timepiece module according to an embodiment in which the present invention has been applied to a wristwatch.

This wristwatch includes a wristwatch module 1, as shown in FIG. 1. The timepiece module 1, which is incorporated into a wristwatch case (not shown), and includes a housing 2. On the upper surface of this housing 2, a dial 3 is arranged. In this housing 2, a timepiece movement 4 is provided.

This timepiece movement 4 includes a pointer shaft 5 protruding toward a higher position than the dial 3 through a through-hole 3a of the dial 3 and is structured such that a pointer 6 is attached to the upper end of this pointer shaft 5, as shown in FIG. 1. As a result, the timepiece movement 4 is structured such that the pointer shaft 5 is rotated so as to cause the pointer 6 to move above the dial 3 and thereby indicate the time.

Figure 2:
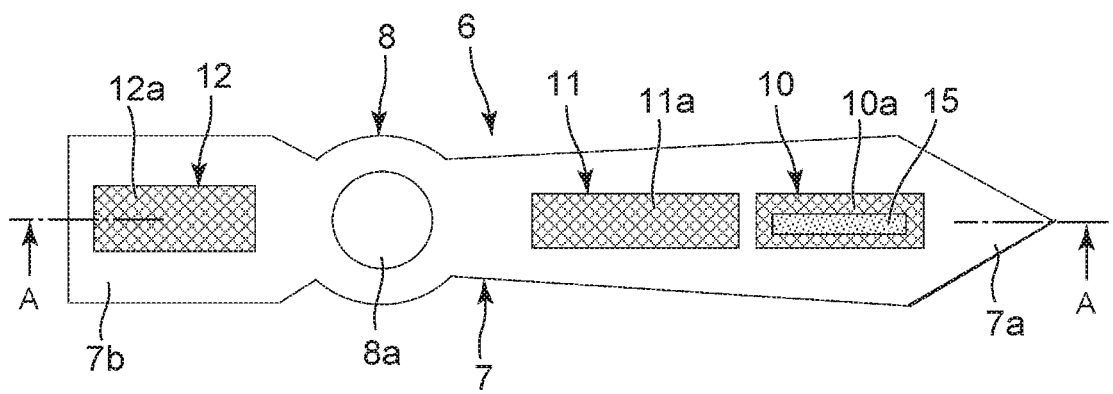
FIG. 2 is an enlarged plan view showing a pointer of the timepiece module shown in FIG. 1.
Figure 3:
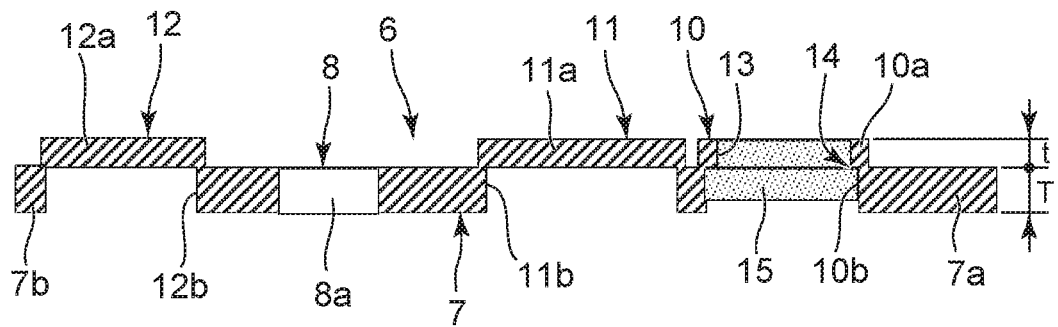
FIG. 3 is an enlarged sectional view showing a cross section of the pointer taken along line A-A in FIG. 2.

The pointer 6 includes a pointer body 7, as shown in FIG. 1 to FIG. 3. This pointer body 7 includes a pointer attachment section 8 referred to as "pipe" and a plurality of thick sections 10 to 12, and is structured such that the pointer attachment section 8 is attached to the upper end of the pointer shaft 5. This pointer body 7 is formed in a long narrow shape by a metal such as aluminum or brass.

That is, this pointer body 7 has one end serving as a leading end 7a (in FIG. 2, a right end) formed into a tapered shape and the other end 7b (in FIG. 2, a left end) shaped into a wide shape, as shown in FIG. 2 and FIG. 3. The pointer attachment section 8 is a rotation center portion of the pointer body 7 and includes, in a position closer to the other end 7b than a middle portion of the pointer body 7 in the longitudinal direction of the pointer body 7, a circular attachment hole 8a provided penetrating through the front and back surfaces of the pointer body 7.

The plurality of thick sections 10 to 12 includes a first thick section 10 provided along the longitudinal direction of the pointer body 7 in an area in the pointer body 7 located on a leading end 7a side, a second thick section 11 provided along the longitudinal direction of the pointer body 7 in an area located between this first thick section 10 and the pointer attachment section 8, and a third thick section 12 provided along the longitudinal direction of the pointer body 7 in an area located between the pointer attachment section 8 and the other end 7b of the pointer body 7, as shown in FIG. 2 and FIG. 3. The first thick section 10, the second thick section 11, and the third thick section 12 are linearly provided side by side along the longitudinal direction of the pointer body 7. The first thick section 10 is provided in the area in the pointer body 7 located on the leading end 7a side and projects from the front surface (in FIG. 3, the upper surface) of the pointer body 7 by being embossed, as shown in FIG. 2 and FIG. 3. That is, this first thick section 10 includes a convex section 10a projecting from the front surface of the pointer body 7 by being embossed and a concave section 10b that is open to the back surface (in FIG. 3, the lower surface) of the pointer body 7, and these sections are formed in long rectangular shapes along the longitudinal direction of the pointer body 7.

This first thick section 10 is formed such that the outer periphery of the convex section 10a is slightly larger than the inner periphery of the concave section 10b, as shown in FIG. 2 and FIG. 3. Further, the concave section 10b is formed such that its depth is substantially the same in size as a thickness T of the pointer body 7. Further, the convex section 10a has a thickness t which is thinner than the thickness T of the pointer body 7 (t<T), and is formed with a thickness (t≈½T) which is about a half thickness (approximately ½T) of the thickness T of the pointer body 7.

In the convex section 10a of this first thick section 10, a rectangular opening section 13 whose opening area is slightly smaller than the concave section 10b is provided penetrating from the surface of the convex section 10a to the concave section 10b, as shown in FIG. 2 and FIG. 3. As a result, in the first thick section 10, an accommodation section 14 penetrating through the front and back surfaces of the first thick section 10 is provided by the opening section 13 of the convex section 10a and the concave section 10b.

This accommodation section 14 is formed such that its depth is the same in size (T+t≈3/2T) as a thickness obtained by adding the thickness T of the pointer body 7 and the thickness t of the convex section 10a together, as shown in FIG. 2 and FIG. 3. Further, this accommodation section 14 is formed to be large in capacity by the rectangular concave section 10b provided in the pointer body 7 and the rectangular opening section 13 provided in the convex section 10a corresponding to this concave section 10b.

In the accommodation section 14 of this first thick section 10, a luminous member 15 which emits light in reaction to light is provided, as shown in FIG. 2 and FIG. 3. This luminous member 15 stores extraneous light as light energy and emits light in a dark place by means of the light energy thus stored, and is embedded with a sufficient thickness and a sufficient capacity in the accommodation section 14 provided by the opening section 13 of the convex section 10a and the concave section 10b so as to penetrate through the front and back surfaces of the pointer body 7. The luminous member 15 is formed by a first luminous section embedded in the opening section 13 of the convex section 10a of the accommodation section 14 and a second luminous section embedded in the concave section 10b. Further, the area of the second luminous section is formed to be larger than the area of the first luminous section in a planar view of the pointer.

That is, the accommodation section 14 is formed such that its depth is deeper than the thickness of the pointer body 7 and its capacity is large, as shown in FIG. 2 and FIG. 3. As a result, the luminous member 15 embedded in this accommodation section 14 is formed to be large in volume by being formed such that its thickness is greater than the thickness T of the pointer body 7 and formed to be long in the longitudinal direction of the pointer body 7. As a result, the luminous member 15 is structured such that its luminance is sufficiently high and its light-emitting time is long when the luminous member 15 emits light inside the accommodation section 14.

As a result, the luminous member 15 is structured such that extraneous light can be sufficiently stored as light energy by the extraneous light entering from the front and back surfaces of pointer body 7, as shown in FIG. 2 and FIG. 3. Further, this luminous member 15 is structured such that light is emitted with a high luminance in a dark place by the light energy thus stored and the upper surface of the dial 3 is illuminated by the light thus emitted being released from the front and back surfaces of the pointer body 7.

In this embodiment, although the luminous member 15 is provided in a state where its front surface is flush with the surface of the convex section 10a of the first thick section 10 and its back surface is slightly depressed than the back surface of the pointer body 7, the luminous member 15 may be provided flush with the back surface of the pointer body 7. That is, by providing this luminous member 15 in a state where its back surface is slightly depressed than the back surface of the pointer body 7, the weight balance of the pointer body 7 is adjusted. Conversely, by providing this luminous member 15 such that its back surface is flush with the back surface of the pointer body 7, the thickness of the luminous member 15 is increased so that its volume can be made larger.

Meanwhile, the second thick section 11 is provided in an area in the pointer body 7 located between the thick section 10 located on the leading end 7a side of the pointer body 7 and the pointer attachment section 8 and projects from the front surface (in FIG. 3, the upper surface) of the pointer body 7 by being embossed, as shown in FIG. 2 and FIG. 3. That is, this second thick section 11 includes a convex section 11a projecting from the front surface of the pointer body 7 by being embossed and a concave section 11b that is open to the back surface (in FIG. 3, the lower surface) of the pointer body 7, and these sections are formed in long rectangular shapes along the longitudinal direction of the pointer body 7.

As with the first thick section 10, this second thick section 11 is formed such that the outer periphery of the convex section 11a is slightly larger than the inner periphery of the concave section 11b, as shown in FIG. 2 and FIG. 3. Further, the concave section 11b is formed such that its depth is substantially the same in size as the thickness T of the pointer body 7. Further, the convex section 11a has a thickness t which is thinner than the thickness T of the pointer body 7, and is formed with a thickness (t≈½T) which is about a half thickness (approximately ½T) of the thickness T of the pointer body 7, i.e. with substantially the same thickness as the convex section 10a of the first thick section 10.

Further, the third thick section 12 is provided in an area in the pointer body 7 located between the pointer attachment section 8 and the other end 7b of the pointer body 7 and projects from the front surface (in FIG. 3, the upper surface) of the pointer body 7 by being embossed, as shown in FIG. 2 and FIG. 3. That is, this third thick section 12 includes a convex section 12a projecting from the front surface of the pointer body 7 by being embossed and a concave section 12b that is open to the back surface (in FIG. 3, the lower surface) of the pointer body 7, and these sections are formed in long rectangular shapes along the longitudinal direction of the pointer body 7.

As with the first and second thick sections 10 and 11, this third thick section 12 is formed such that the outer periphery of the convex section 12a is slightly larger than the inner periphery of the concave section 12b, as shown in FIG. 2 and FIG. 3. Further, the concave section 12b is formed such that its depth is substantially the same in size as the thickness T of the pointer body 7. Further, the convex section 12a has a thickness t which is thinner than the thickness T of the pointer body 7, and is formed with a thickness (t≈½T) which is about a half thickness (approximately ½T) of the thickness T of the pointer body 7 and with a greater width than the first and second thick sections 10 and 11.

Each of these first to third thick sections 10 to 12 is structured such that, even though the convex sections 10a to 12a projecting from the front surface of the pointer body 7 by being embossed are provided in a plurality of areas of the pointer body 7, the concave sections 10b to 12b that are open to the back surface of the pointer body 7 and corresponding to these convex sections 10a to 12a, respectively, are provided in a plurality of areas in the pointer body 7, whereby there is no change in the weight of the point body 7.

Further, the first to third thick sections 10 to 12 have their respective surfaces subjected to a surface treatment. That is, a surface (in FIG. 3, the upper surface) of the first thick section 10 located at an edge of the opening section 13 in the convex section 10a, a surface (in FIG. 3, the upper surface) of the convex section 11a of the second thick section 11, and a surface (in FIG. 3, the upper surface) of the convex section 12a of the third thick section 12 are subjected to a surface treatment such as a mirror finish, hairline finish or a pear-skin finish.

Next, the manufacture of the pointer 6 of this wristwatch will be described.

In this case, the attachment hole 8a of the pointer attachment section 8 is formed in the pointer body 7 by press punching, and the first to third thick sections 10 to 12 are formed by press embossing. That is, the embossing by which the first to third thick sections 10 to 12 are formed is half die cutting by which the pointer body 7 is half punched in its thickness direction.

When the first to third thick sections 10 to 12 are formed in the pointer body 7 by this embossing, the convex sections 10a to 12a of the first to third thick sections 10 to 12 projecting from the front surface of the pointer body 7 and the concave sections 10b to 12b of the first to third thick sections 10 to 12 that are open to the back surface of the pointer body 7 are formed having long rectangular shapes along the longitudinal direction of the pointer body 7, in a plurality of areas of the pointer body 7.

That is, the first thick section 10 is provided in the area in the pointer body 7 located on the leading end 7a side. The second thick section 11 is provided in the area located between this first thick section 10 located on the leading end 7a side of the pointer body 7 and the pointer attachment section 8. The third thick section 12 is provided in the area located between the pointer attachment section 8 and the other end 7b of the pointer body 7.

In this case, the first to third thick sections 10 to 12 are provided such that the convex sections 10a to 12a and the concave sections 10b to 12b are provided on the front and back surfaces of the pointer body 7 in correspondence with each other, respectively. That is, the concave sections 10b to 12b of the first to third thick sections 10 to 12 are formed into long rectangular shapes in the longitudinal direction of the pointer body 7 such that their depths are the same in size as the thickness T of the pointer body 7.

Further, the convex sections 10a to 12a of the first to third thick sections 10 to 12 are formed into long rectangular shapes in the longitudinal direction of the pointer body 7 such that their thicknesses t are each a thickness (t≈½T) which is about a half thickness of the thickness T of the pointer body 7. For this reason, even though the first to third thick sections 10 to 12 are provided in a plurality of areas of the pointer body 7, there is no change in the weight of the pointer body 7 as a whole.

In this state, in the convex section 10a of the first thick section 10, the rectangular opening section 13 which is slightly smaller in inner shape than the concave section 10b is provided penetrating from the surface of the convex section 10a to the concave section 10b. As a result, in the first thick section 10, the accommodation section 14 penetrating through the front and back surfaces of the pointer body 7 is provided by the opening section 13 of the convex section 10a and the concave section 10b.

This accommodation section 14 is formed such that its depth is the same in size as a thickness obtained by adding the thickness T of the pointer body 7 and the thickness t of the convex section 10a together. Further, this accommodation section 14 is formed to be greater in thickness than the pointer body 7 and large in capacity by the rectangular concave section 10b provided in the pointer body 7 and the rectangular opening section 13 provided in the convex section 10a corresponding to this concave section 10b.

Moreover, the surface (in FIG. 3, the upper surface) of the first thick section 10 located at the edge of the opening section 13 in the convex section 10a, the surface (in FIG. 3, the upper surface) of the convex section 11a of the second thick section 11, and the surface (in FIG. 3, the upper surface) of the convex section 12a of the third thick section 12 are subjected to a surface treatment such as a mirror finish, hairline finish or a pear-skin finish.

In this state, the luminous member 15 is embedded in the accommodation section 14 of the first thick section 10. At this point in time, the accommodation section 14 is formed to be large in capacity because the thickness of the accommodation section 14 is greater than the thickness of the pointer body 7 and the accommodation section 14 is formed in a long rectangular shape in the longitudinal direction of the pointer body 7. For this reason, the luminous member 15 embedded in the accommodation section 14 is formed thick in thickness and large in volume.

Further, at this point, even though the pointer body 7 is formed such that a portion of the pointer body 7 closer to the leading end 7a than the pointer attachment section 8 is longer than a portion of the pointer body 7 closer to the other end 7b than the pointer attachment section 8, the accommodation section 14 penetrating through the front and back surfaces of the pointer body 7 is provided in the first thick section 10 on the leading end 7a side of the pointer body 7, and the luminous member 15 is provided in this accommodation section 14, the pointer body 7 has its center of gravity located in a center portion of the pointer attachment section 8 because the luminous member 15 is lighter in specific gravity than the pointer body.

Aside from this, a resin or metal of a higher specific gravity may be embedded in each of the concave sections 11b and 12b of the second and third thick sections 11 and 12 in order to adjust the weight balance of the pointer body 7. This also allows the pointer 6 to be formed in an adjusted weight balance.

Next, the mechanism of this pointer 6 will be described.

In a case where this pointer 6 is attached to the pointer shaft 5 of the timepiece movement 4, the upper end of the pointer shaft 5 is fixedly fitted into the attachment hole 8a of the pointer attachment section 8 of the pointer body 7. This causes the pointer 6 to be attached to the pointer shaft 5 of the timepiece movement 4. In this state, when the timepiece movement 4 rotates the pointer shaft 5, the pointer 6 moves above the dial 3 as this pointer shaft 5 rotates. As a result, the pointer 6 indicates the time, so that the current time can be known.

In this case, even though the pointer body 7 is formed such that the portion of the pointer body 7 closer to the leading end 7a than the pointer attachment section 8 is longer than the portion of the pointer body 7 closer to the other end 7b than the pointer attachment section 8, the accommodation section 14 penetrating through the front and back surfaces of the pointer body 7 is provided in the first thick section 10 on the leading end 7a side of the pointer body 7, and the luminous member 15 is provided in this accommodation section 14, the pointer body 7 has its center of gravity located in the center portion of the pointer attachment section 8 because the luminous member 15 is lighter in specific gravity than the pointer body.

Further, aside from this, a resin or metal of a higher specific gravity may be embedded in each of the concave sections 11b and 12b of the second and third thick sections 11 and 12 in order to adjust the weight balance of the pointer body 7. Even in that case, when the pointer body 7 moves as the pointer shaft 5 rotates, the pointer body 7 rotates in a balanced manner with the pointer attachment section 8 at the center, whereby battery life can be prolonged.

Further, at this point, when the luminous member 15 of the pointer 6 is irradiated with extraneous light, the luminous member 15 stores the extraneous light as light energy. In this case, the luminous member 15 embedded in the accommodation section 14 of the pointer body 7 is thick in thickness and large in volume and can therefore store sufficient light energy. Further, when this wristwatch is used in a dark place, the luminous member 15 embedded in the accommodation section 14 of the pointer body 7 emits light with a high luminance.

That is, the luminous member 15 embedded in the accommodation section 14 is thick in thickness and large in volume (capacity) and therefore emits light with a higher luminance and over a long time. When the luminous member 15 emits light in this manner, the light thus emitted is released to the front and back surfaces of the pointer body 7. For this reason, the front surface of the pointer body 7 and a surface of the dial 3 can be brightly illuminated over a long time, so that a satisfactory visual identification of the time indicated by the pointer 6 can be made.

Thus, according to the pointer 6 of this wristwatch, the luminance of the luminous member 15 can be made higher and the light-emitting time of the luminous member 15 can be extended by including the first thick section 10 formed in the pointer body 7 so as to be thicker than the thickness T of the pointer body 7, the accommodation section 14 provided in this first thick section 10 so as to penetrate through the front and back of the first thick section 10, and the luminous member 15 provided in this accommodation section 14.

That is, in this pointer 6, the first thick section 10 is formed to be thicker than the thickness T of the pointer body 7 and the accommodation section 14 is provided in this first thick section 10 so as to penetrate through the front and back surfaces of the pointer body 7, whereby the accommodation section 14 can be formed to be deeper than the thickness T of the pointer body 7 and therefore large in capacity. For this reason, the volume of the luminous member 15 can be made larger by increasing the thickness of the luminous member 15 provided in the accommodation section 14, whereby the luminance of the luminous member 15 can be made higher and the light-emitting time of the luminous member 15 can be significantly extended.

In this case, since the first thick section 10 includes the convex section 10a projecting from the front surface of the pointer body 7 and the concave section 10b provided in the back surface of the pointer body 7 and corresponding to the convex section 10a, the weight of the pointer body 7 as a whole can be prevented from changing even when the first thick section 10 is provided in the pointer body 7. Further, since the accommodation section 14 is provided by the opening section 13 provided in the convex section 10a and the concave section 10b so as to penetrate through the front and back surfaces of the first thick section 10, the accommodation section 14 can be formed to be deeper than the thickness T of the pointer body 7 and formed to be large in capacity.

For this reason, in this pointer 6, the luminous member 15 which is embedded in the accommodation section 14 can be formed to be sufficiently thicker than the thickness T of the pointer body 7, whereby the luminous member 15 can be formed to be large in volume. This allows the luminous member 15 to emit light with a high luminance, makes it possible to significantly extend the light-emitting time of the luminous member 15, and makes it possible to prevent the pointer body 7 from increasing in weight even when the luminous member 15 is embedded in the accommodation section 14.

Further, the first thick section 10 is formed such that the convex section 10a projecting from the front surface of the pointer body 7 is formed in a long rectangular shape in the longitudinal direction of the pointer body 7, the concave section 10b provided in the back surface of the pointer body 7 is formed in a rectangular shape which is slightly smaller in outer shape than the convex section 10a, and the opening section 13 provided in the convex section 10a is formed in a rectangular shape which is slightly smaller in outer shape than the concave section 10b, whereby the accommodation section 14 can be formed into a long rectangular shape in the longitudinal direction of the pointer body 7.

As a result, the capacity of the accommodation section 14 can be made significantly larger, whereby the volume of the luminous member 15 provided in the accommodation section 14 can be made further larger. This allows the luminous member 15 to emit light with an even higher luminance and makes it possible to significantly extend the light-emitting time of the luminous member 15.

Further, in this pointer 6, the first thick section 10 is formed by half die cutting that is embossing, by which the pointer body 7 is half punched in its thickness direction. This makes it possible to simply and easily form the first thick section 10 in the pointer body 7 and makes it possible to prevent the pointer body 7 from changing in weight even when the first thick section 10 is provided in the pointer body 7.

In this case, the first thick section 10 can be formed by half die cutting that is embossing such that the outer periphery of the convex section 10a is slightly larger than the inner periphery of the concave section 10b, the depth of the concave section 10b is substantially the same in size as the thickness T of the pointer body 7, and the convex section 10a has a thickness ($t \approx \frac{1}{2}T$) which is about a half thickness (approximately $\frac{1}{2}T$) of the thickness T of the pointer body 7.

Further, in this pointer 6, the first to third thick sections 10 to 12 are provided in a plurality of areas of the pointer body 7. This makes it possible to improve the design of the pointer 6 as a whole by means of these first to third thick sections 10 to 12. In this case, since the first to third thick sections 10 to 12 are provided with the concave sections 10b to 12b that are open to the back surface, the pointer body 7 can be prevented from increasing in weight even when the first to third thick sections 10 to 12 are provided in the pointer body 7.

Further, in this pointer 6, even though the pointer body 7 is formed such that the portion of the pointer body 7 closer to the leading end 7a than the pointer attachment section 8 is longer than the portion of the pointer body 7 closer to the other end 7b than the pointer attachment section 8, the accommodation section 14 penetrating through the front and back surfaces of the pointer body 7 is provided in the first thick section 10 on the leading end 7a side of the pointer body 7, and the luminous member 15 is provided in this accommodation section 14, the pointer body 7 has its center of gravity located in the center portion of the pointer attachment section 8 because the luminous member 15 is lighter in specific gravity than the pointer body. For this reason, when the pointer body 7 moves as the pointer shaft 5 rotates, the pointer body 7 rotates in a balanced manner with the pointer attachment section 8 at the center, whereby battery life can be prolonged.

Furthermore, in this pointer 6, the first to third thick sections 10 to 12 have their surface subjected to a surface treatment. This makes it possible to further improve the design of the pointer 6. That is, the design of the pointer 6 can be further enhanced by subjecting the surface of the first thick section 10 located at the edge of the opening section 13 in the convex section 10a, the surface of the convex section 11a of the second thick section 11, and the surface of the convex section 12a of the third thick section 12 to a surface treatment such as a mirror finish, hairline finish or a pear-skin finish.

In the above-described embodiment, the first to third thick sections 10 to 12 are formed in the pointer body 7 by press embossing. However, the present invention is not limited thereto. For example, the first to third thick sections 10 to 12 may be cut out by cutting or the first to third thick sections 10 to 12 may be cut out by laser processing. Alternatively, the first thick section 10 may be formed by lance bending. That is, the first thick section 10 needs only to be formed after a slit (lance) has been made parallel to the pointer body 7.

In the above-described embodiment, the present invention has been applied to a pointer-type wristwatch. However, the present invention is not necessarily required to be applied to a pointer-type wristwatch. For example, the present invention is applicable to various pointer-type timepieces such as a travel watch, an alarm clock, a table clock, and a wall clock. Further, the present invention is not necessarily required to be applied to a timepiece. For example, the present invention is also applicable to a measuring instrument such as a meter.

While the present invention has been described with reference to the preferred embodiments, it is intended that the invention be not limited by any of the details of the description therein but includes all the embodiments which fall within the scope of the appended claims.

What is claimed is:

1. A pointer comprising:
   a thick section formed on a pointer body in a manner to be thicker than a thickness of the pointer body;
   an accommodation section provided in the thick section in a manner to penetrate through a front and back of the thick section; and
   a luminous member provided in the accommodation section,
   wherein the thick section comprises a convex section projecting from a front surface of the pointer body and a concave section provided in a back surface of the pointer body in a manner to correspond to the convex section, and
   wherein the accommodation section is provided penetrating through front and back surfaces of the thick section, by an opening section provided in the convex section and the concave section.

2. The pointer according to claim 1, wherein the thick section comprises an opening section, and
   wherein the thick section is formed on a leading end side of the pointer body.

3. The pointer according to claim 2, wherein the thick section comprises a convex section projecting from a front surface of the pointer body and a concave section provided in a back surface of the pointer body in a manner to correspond to the convex section, and
   wherein the accommodation section is provided penetrating through front and back surfaces of the thick section, by the opening section provided in the convex section and the concave section.

4. The pointer according to claim 1, wherein the luminous member comprises a first luminous section and a second luminous section, and
   wherein an area of the second luminous section is larger than an area of the first luminous section, in a planar view.

5. The pointer according to claim 2, wherein the luminous member comprises a first luminous section and a second luminous section, and
   wherein an area of the second luminous section is larger than an area of the first luminous section, in a planar view.

6. The pointer according to claim 1, wherein the thick section is formed by half die cutting by which the pointer body is half punched in a thickness direction.

7. The pointer according to claim 2, wherein the thick section is formed by half die cutting by which the pointer body is half punched in a thickness direction.

8. The pointer according to claim 1, wherein a plurality of thick sections are provided in a plurality of areas of the pointer body.

9. The pointer according to claim 2, wherein a plurality of thick sections are provided in a plurality of areas of the pointer body.

10. The pointer according to claim 1, wherein the thick section is linearly provided along a longitudinal direction of the pointer body.

11. The pointer according to claim 2, wherein the thick section is linearly provided along a longitudinal direction of the pointer body.

12. The pointer according to claim 1, wherein the thick section has a surface subjected to a surface treatment.

13. The pointer according to claim 2, wherein the thick section has a surface subjected to a surface treatment.

14. A timepiece comprising the pointer according to claim 1.

* * * * *